Oct. 28, 1941.                    H. NAEF                    2,260,858
              DISPENSING DEVICE FOR MAKING AROMATIC BEVERAGES
                           Filed July 11, 1939
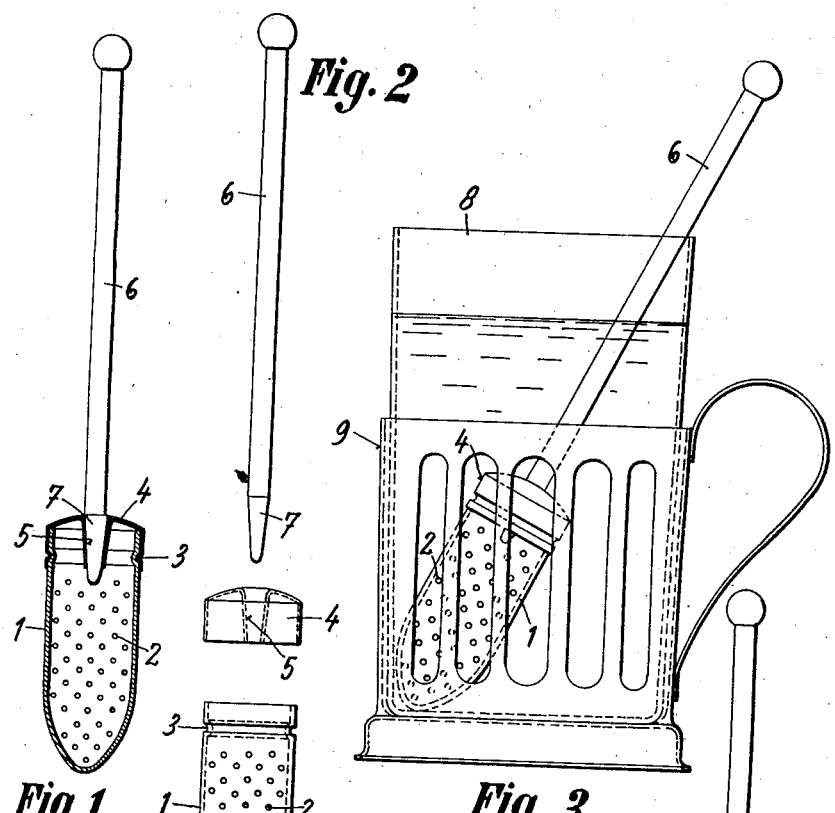
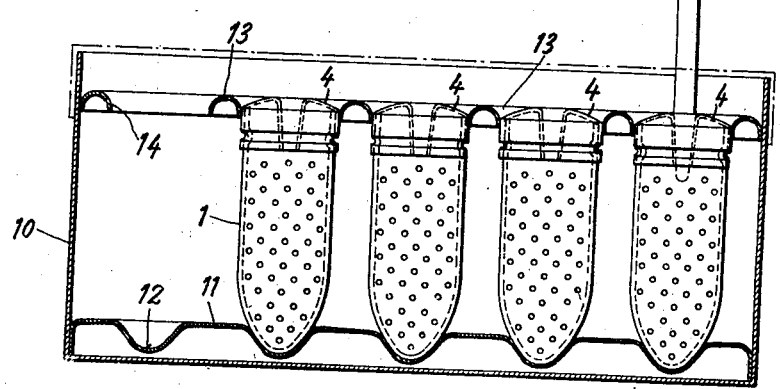
Inventor:

Patented Oct. 28, 1941

2,260,858

UNITED STATES PATENT OFFICE 2,260,858

DISPENSING DEVICE FOR MAKING AROMATIC BEVERAGES

Hans Naef, Zurich, Switzerland

Application July 11, 1939, Serial No. 283,869

2 Claims. (Cl. 206—56)

The present invention refers to a plunging filter for tea and similar, aromatic beverages, provided with a closable vessel which holds the substances to be boiled and contains openings for the entrance of the water.

The vessel, furthermore, is provided, according to the invention, with means for quickly and easily removably fastening of a holder to the vessel.

A further object of the present invention resides in the provision of a container for a plurality of vessels of the aforesaid type; said container is so constructed that removal of individual vessels from the container is only possible by means of said holder so that touching of the vessels by hand is made impossible. The container is particularly designed for the use in restaurants where the container can be served to the guest who, by means of the special holder, can remove his vessel himself without touching same by hand and the invention provides absolute insurance that the vessel served to the guest is not touched by anybody's hand.

In the drawing:

Fig. 1 is a longitudinal sectional view of a plunging filter according to the present invention;

Fig. 2 is a view of the disassembled filter according to the invention;

Fig. 3 shows the filter in a teaglass;

Fig. 4 is a cross sectional view of a paste-board container according to the invention.

In Figures 1 to 4 of the drawing, numeral 1 designates a cylindric vessel having a rounded bottom. The vessel may be made of glass and is provided with perforations 2 for the entrance of water to the interior of the vessel. Vessel 1 has near its open top-end on the outside an annular groove 3. Numeral 4 designates a cover or lid for closing the vessel. This lid consists of a flexible, but not too elastic material, for instance sheet metal. The lid has a central conical portion 5, which is to cooperate with a glass handle 6. At its lower end this handle ends in a cone 7. In calculating and designing the conicity of the handle as well as the conicity of portion 5, care must be taken that the tangent of the cone is a little smaller than the coefficient of the sliding friction between the handle 6 and the side of portion 5, so that in entering the handle into portion 5, connection by friction is produced and the handle is firmly held in portion 5.

Fig. 3 shows a teaglass 8, standing in one of the usual saucers and with a filter according to Figures 1 and 2 inserted.

Numeral 10 in Figure 4 designates a box or container made of suitable material, for instance, card-board. This box has, very little above the bottom, a grate 11 which has depressed portions 12.

Numeral 13 indicates a further grate, installed above grate 11, which has outpressed portions 14 bordering openings and being located opposite portions 12 in grate 11. The size of vessels 1 is such as to hold a sufficient amount of aromatic material for preparing a glass of tea of the usual size.

After the vessels are filled they are covered with lids 4 which are pressed into the grooves 3 by means of special pincers, so that a subsequent removal of the lids without visible damages is no more possible. The filled vessels are packed and shipped in boxes 10 or in similar efficient wrappings. They are packed in the boxes, standing straight up in rows and are kept in definite position by grates 11 and 13. The top grate 13 of each box is placed at sufficient height, so that the lids 4 do not project beyond the grate, and the vessels cannot or at least not without difficulty be removed from the box, unless a handle 6 is used. The removal, however, is quite easy, if handle 6 is used.

Handle 6 is simply introduced into the opening 5 of the lid of one of the vessels and removed from the open box together with the vessel. The filter is now placed in the usual way in a glass of hot water, until the beverage which is to be prepared, has attained its strength or its aroma desired.

After the preparation of the beverage, the plunging filter is removed from the glass and the handle pulled out of the lid. The handle may be reused whereas the vessel must be laid aside, opened and cleaned and sent to the purveyor of the tea or to the selling organization, in order to have it refilled.

What I claim is:

1. Dispensing device for making aromatic beverages comprising a plurality of relatively small containers adapted to be immersed in hot water and to be filled with tea or other basic aromatic ingredient and having wall portions provided with passage means for hot water to enter and leave the inside of said containers, a relatively large container for storing said relatively small containers, said large container comprising grate-like holding means having a plurality of opening, said small containers having portions tightly fitting into said openings and having a surface substantially flush with the surface of said holding means when said small containers are inserted in said openings, a holder member for individually holding one of said small containers, said holder member having an end provided with connecting means, said small containers having female connecting means corresponding to and adapted to temporarily cooperate with the connecting means of said holder member for temporarily connecting said holder member with only one of said small containers and removing the small container with which it is connected from said holding means and from said large container.

2. Dispensing device for making aromatic beverages comprising a plurality of relatively small containers adapted to be immersed in hot water and to be filled with tea or other basic aromatic ingredient and having wall portions provided with passage means for hot water to enter and leave the inside of said containers, a relatively large container for storing said relatively small containers, said large container comprising grate-like holding means having a plurality of openings provided with frictional engaging means, said small containers having frictional engaging portions corresponding to said frictional engaging means and tightly fitting into said openings and having a surface substantially flush with the surface of said holding means when said small containers are inserted in said openings, a holder member for individually holding one of said small containers, said holder member having an end provided with frictional connecting means, said small containers having female frictional connecting means corresponding to and adapted to temporarily cooperate with the connecting means of said holder member for temporarily frictionally connecting said holder member with only one of said small containers and removing the small container with which it is connected from said holding means and from said large container, the frictional connecting capacity of the connecting means of said holder member and the corresponding connecting means of said small containers being greater than the frictional engaging capacity of said engaging means of said large container and the corresponding frictional engaging portions of said small containers.

HANS NAEF.